United States Patent Office 3,496,190
Patented Feb. 17, 1970

3,496,190
BIS-TETRACHLORO-ISOINDOLIN-1-ON-3-YLIDENE-IMINO PIGMENT
Jost von der Crone and André Pugin, Riehen, Switzerland, assignors to J. R. Geigy A.G., Basel, Switzerland
No Drawing. Filed Aug. 22, 1966, Ser. No. 573,804
Claims priority, application Switzerland, Sept. 13, 1965, 12,693/65
Int. Cl. C08c *11/76;* C09b *7/02;* C08f *45/66*
U.S. Cl. 260—325                                    1 Claim

ABSTRACT OF THE DISCLOSURE

The pigment of the formula

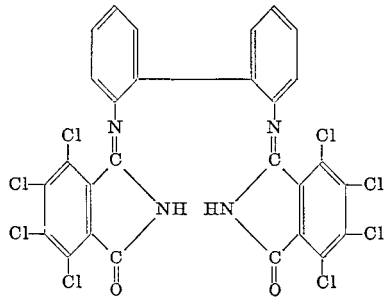

is a greenish-yellow pigment of great color strength which satisfies present-day requirements as to purity color strength and fastness properties. The new pigment is useful for pigmenting polymeric organic material such as inks, paints, etc., for coloring cellulose acetate spinning masses, for pigmenting plastics such as polyethylene, etc., and for pigmenting rubber and paper masses or for coating lamina.

---

The present invention concerns a new pigment of the bis-(tetrachloro-isoindolin-1-on - 3 - ylidene-imino)-aryl series, as well as, as industrial product, the polymeric organic material pigmented by the use of this new pigment.

Greenish yellow pigments which satisfy present day requirements with regard to purity, color strength and fastness properties, are relatively few. They are of importance because, among other reasons, they produce very beautiful, pure green shades in combination with known fast blue pigments, while such shades cannot be obtained with reddish yellow pigments.

Of the series of bis-(tetrachloro-isoindolin-1-on - 3-ylidene-imino)-aryl compounds of good color strength having the properties of pigments required by present day standards, the majority have red, orange and reddish yellow shades. For example, the pigment containing the 4,4′-diphenyl radical as bridging member is orange. There is a great demand, however, for greenish yellow pigments.

We have now found that, in the above-mentioned series of compounds, a greenish-yellow pigment of great color strength which satisfies all of the above-mentioned requirements, and is of the formula

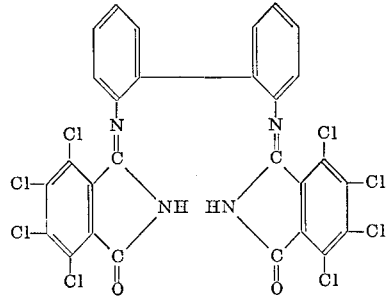

is obtained by condensing 2,2′-diaminodiphenyl with 2 mols of a 4,5,6,7-tetrachloro-isoindoline-1-one which contains in the 3-position substituents which can easily be exchanged, which substituents, depending on their type and number, require two bonds and are more mobile than oxygen bound with a double bond.

Examples of mobile substituents contained in the 3-position by the 4,5,6,7-tetrachloro-isoindoline - 1-ones used as starting materials are two halogen atoms, particularly chlorine atoms, two secondary amino groups, mainly piperidino or morpholino groups, or two alkoxy groups, e.g. methoxy or ethoxy groups, an imino or a thio group. Preferably, two methoxy groups are in the 3-position.

These starting materials are known. Compounds containing two halogen atoms in the 3-position are obtained, e.g., by reacting halogenating agents such as phosphorus pentachloride with tetrachlorophthalic acid imide. The 3,3-dihalogen-4,5,6,7-tetrachloro-isoindoline - 1 - ones so produced can be converted into 3-imino - 4,5,6,7-tetrachloro-isoindoline - 1 - ones by reaction with ammonia or into 3,3-bis-tert. amino- or 3,3-dialkoxy- 4,5,6,7-tetrachloro-isoindoline - 1 - ones by reaction with secondary amines or with alkanols. 4,5,6,7-tetrachloro-isoindoline-1-ones containing two alkoxy groups in the 3-position can also be produced by reacting a 3,4,5,6-tetrachloro-2-cyanobenzoic acid ester, e.g., the methyl ester, with the desired alkanol in the presence of alkaline substances.

Examples of starting materials which cen be used according to the invention are: 3-imino-, 3-thio-, 3,3-bis-piperidino-, 3,3-bis-morpholino-, 3,3-dichloro-, 3,3 - dibromo-, 3,3-dimethoxy-, 3,3-diethoxy-, or 3,3-dibutoxy-4,5,6,7-tetrachloro-isoindoline - 1 - one. 3,3-dimethoxy-4,5,6,7-tetrachloro-isoindoline - 1 - one is preferred.

The condensation of the 2,2′-diaminodiphenyl with the 4,5,6,7-tetrachloro-isoindoline - 1 -one containing substituents which react in the 3-position occurs even in the cold, optionally while heating the intimately mixed components; it is performed particularly advantageously in the presence of organic solvents which are inert, i.e., which do not take part in the reaction.

When alkali metal salts (particularly sodium salt) of 3,3 - dialkoxy - 4,5,6,7 - tetrachloro - isoindoline - 1 - ones or 3-imino-, 3-thio- or 3,3-bis-tert.amino- 4,5,6,7-tetrachloro-isoindoline-1-ones are used as starting materials, then the use of organic solvents which are miscible with water is advantageous, e.g., low aliphatic alcohols such as low alkanols, e.g. methanol or ethanol, low cyclic ethers such as dioxan, low aliphatic ketones such as acetone, or low fatty acids, e.g. acetic acid. In such cases the condensation is performed at relatively low temperatures. Advantageously, the condensation is performed in the presence of base binding agents; examples of such are low fatty acids which serve at the same time as solvents, particularly acetic acid.

When 3,3 - dihalogen - 4,5,6,7 - tetrachloro - isoindoline-1-ones are used, organic solvents not containing hydroxyl groups are preferred such as hydrocarbons, e.g. aromatic hydrocarbons such as benzene, toluene, xylenes, tetrahydronaphthalene or diphenyl, or cycloaliphatic hydrocarbons, e.g. cyclohexane, also halogenated hydrocarbons such as aliphatic halogenated hydrocarbons, e.g. carbon tetrachloride or tetrachloroethylene, or aromatic halogenated hydrocarbons such as chlorobenzene or di- and tri-chlorobenzenes, also aromatic nitro hydrocarbons such as nitrobenzene, ethers, both aliphatic such as dibutyl ether and aromatic such as diphenyl ether, or low cyclic ethers such as dioxan, also ketones such as acetone, or esters such as esters of low fatty acids with low alkanols.

Immediately after it is formed, the new pigment precipitates from the reaction medium. For certain purposes it can be used direct as crude pigment; however its properties, particularly purity, form and covering power can be further improved by known methods, e.g., by crystallisation or extraction with organic solvents or by milling with milling auxiliaries which can later be removed, e.g. salts.

The new pigment of the bis-tetrachloro-isoindoline-1-one series is suitable for the pigmenting of polymeric organic material, e.g., in printing inks for the graphic industry, in paints having an oily foundation such as in linseed oil colours, or paints having an aqueous foundation such as in dispersion colours, or in lacquers of various types such as in nitro lacquers or stoving lacquers, in the latter case, for example, those based on alkyd resin. In addition it can be used for the colouring of viscose or cellulose acetate spinning masses, for pigmenting plastics such as polyethylene, polystyrene, polyvinyl chloride, which latter can also contain plasticiser, cellulose esters, resins which can be cured, or for the pigmenting of rubber, as well as for the colouring of paper masses or coating of lamina, e.g., in the production of paper laminates.

In these materials, the new pigment produces pure, vivid greenish yellow pigmentings. Compared with previously known dyestuffs of similar constitution, the pigment according to the invention is distinguished in that it combines the greatly desired greenish yellow shade with unexpectedly great colour strength, with remarkably good fastness properties, particularly great fastness to light, very good fastness to migration in articles made of polyvinyl chloride containing plasticiser, excellent fastness to cross lacquering, rubbing and dry cleaning and good stability to heat.

In contrast to known compounds of this class of substances which are comparable in shade and which contain an unsubstituted m-phenylene radical as bridging member, the new pigment is distinguished by a surprisingly greater colour strength in spite of its higher molecular weight.

The following examples illustrate the invention. The temperatures are given therein in degrees centigrade.

EXAMPLE 1

16.5 g. of 3,3-dimethoxy-4,5,6,7-tetrachloro-isoindoline-1-one and 4.6 g. of 2,2'-diaminodiphenyl are refluxed for 2 hours in 200 ml. of glacial acetic acid. The pigment formed is filtered off hot and washed with ethanol. After drying, 17 g. of pigment of the above formula are obtained which can be used without further treatment direct as greenish yellow pigment. The pigment has excellent fastness properties.

If instead of the 16.5 g. of 3,3-dimethoxy-4,5,6,7-tetrachloro-isoindoline-1-one, 14.2 g. of 3-imino-4,5,6,7-tetrachloro-isoindoline-1-one or 22.1 g. of 3,3-dimorpholino-4,5,6,7-tetrachloro-isoindoline-1-one are used and otherwise the procedure given in the example is followed, then the same pigment is obtained in a similarly good yield.

EXAMPLE 2

A solution of 4.6 g. of 2,2'-diaminodiphenyl in 100 ml. of 1,2-dichlorobenzene is added to a solution of 17 g. of 3,3,4,5,6,7-hexachloro-isoindoline-1-one in 200 ml. of 1,2-dichlorobenzene. A yellow precipitate forms immediately. The suspension is heated to 160–170° and stirred for 1 hour at this temperature. The insoluble dyestuff is filtered off hot and washed with ethanol and water. After drying, 13.9 g. of the pigment described in Example 1 are obtained.

EXAMPLE 3

31.4 g. of 3,4,5,6-tetrachloro-2-cyanobenzoic acid methyl ester are added to a sodium methylate solution (obtained from 2.7 g. of sodium and 120 ml. of methanol). The sodium salt of 3,3-dimethoxy-4,5,6,7-tetrachloro-isoindoline-1-one is formed. After 30 minutes, 9.2 g. of 2,2'-diaminodiphenyl are added to the solution formed and then the mixture is stirred for 10 hours at room temperature whereupon the yellow sodium salt of the dyestuff precipitates. The reaction mixture is acidified with 40 ml. of glacial acetic acid and heated for 2 hours under reflux. The insoluble dyestuff is filtered off hot and washed with ethanol and acetone. After drying, 36 g. of the pigment described in Example 1 are obtained. It can be used in this form direct as pigment having excellent fastness properties.

To further improve its colour strength, 15 g. of the crude pigment and 30 g. of anhydrous calcium chloride are placed in a 1 litre vibration mill containing 3.5 kg. steel balls of 1.5 cm. diameter. After vibrating for 1 hour, the product is removed from the mill and the calcium chloride is dissolved out of the pigment with water. The dried pigment is now distinguished by great colour strength and transparency.

To obtain a pigment with the same colour strength and good covering power, 10 g. of pigment which has been milled with salt and 100 ml. of chlorobenzene are refluxed for 2 hours. The pigment is then filtered off hot and dried.

EXAMPLE 4

To produce a colour paste for graphic purposes, 2 g. of the pigment produced according to Example 3, second paragraph, 36 g. of hydrate of alumina, 60 g. of linseed oil varnish of medium viscosity and 0.2 g. of cobalt linoleate are mixed and rubbed on a set of three mixing rollers. The greenish yellow prints attained with this colour paste are strongly coloured, pure and also have excellent fastness to light.

EXAMPLE 5

0.6 g. of the pigment produced according to Example 1 and 67 g. of polyvinyl chloride, 33 g. of dioctyl phthalate, 2 g. of dibutyl tin dilaurate and 2 g. of titanium dioxide are mixed together and rolled on a set of rollers for 10–15 minutes at 140°. The greenish yellow polyvinyl chloride sheets attained therewith are fast to migration, heat and light.

EXAMPLE 6

10 g. of titanium dioxide (Rutil) and 2 g. of the pigment produced according to Example 1 are milled for 48 hours in a ball mill with 88 g. of a mixture of 26.4 g. of coconut alkyd resin, 24.0 g. of melamine-formaldehyde resin (50% solid content), 8.8 g. of ethylene glycol monomethyl ether and 28.8 g. of xylene.

If this lacquer is sprayed onto an aluminium sheet and, after first drying for 30 minutes at room temperature, stoved for 30 minutes at 120°, then a lacquering is obtained which is distinguished by a pure, greenish yellow shade. The lacquering has very good fastness to cross lacquering and light.

We claim:
1. The pigment of the formula

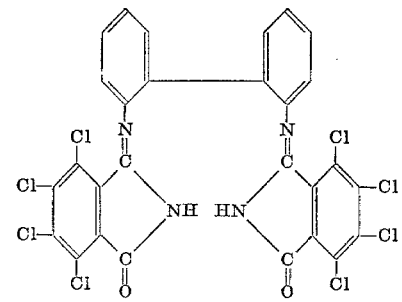

References Cited

UNITED STATES PATENTS 2,973,358   2/1961   Pugin _____ 260—240

ALEX MAZEL, Primary Examiner

J. A. NARCAVAGE, Assistant Examiner

U.S. Cl. X.R.

106—20, 193, 253, 288; 260—37, 39, 40, 41, 762